United States Patent [19]
Robinson

[11] Patent Number: 5,734,829
[45] Date of Patent: Mar. 31, 1998

[54] METHOD AND PROGRAM FOR PROCESSING A VOLUME OF DATA ON A PARALLEL COMPUTER SYSTEM

[75] Inventor: Billy Ray Robinson, Coppell, Tex.

[73] Assignee: International Business Machines Corporation, Armonk, N.Y.

[21] Appl. No.: 546,204

[22] Filed: Oct. 20, 1995

[51] Int. Cl.$^6$ .................................................. G06F 17/00
[52] U.S. Cl. ............................. 395/200.35; 364/421
[58] Field of Search ..................... 395/800, 200.35, 395/200.38, 200.31, 800.35; 364/422, 421

[56] References Cited

U.S. PATENT DOCUMENTS

| | | | |
|---|---|---|---|
| 5,198,979 | 3/1993 | Moorhead | 364/421 |
| 5,349,527 | 9/1994 | Pieprzak | 364/421 |
| 5,504,678 | 4/1996 | Juszczak | 364/421 |
| 5,537,319 | 7/1996 | Schoen | 364/421 |

*Primary Examiner*—Eric Coleman
*Attorney, Agent, or Firm*—Floyd A. Gonzalez

[57] ABSTRACT

A method and program for processing a volume of data such as seismic data on a parallel computer system having a distributed memory system, a host node and a plurality of worker nodes. The output data volume is sliced into horizontal slices and one or more slices are assigned to each worker node. Each worker node performs Kirchoff 3D DMO operations on that portion of the input traces for processing the horizontal slice or slices assigned to that processing node, and passes the output slices to the host node. The host node then assembles the slices into the output data volume. Where there are M worker nodes and the number of slices exceeds M, every $M^{th}$ slice is assigned to a worker node in a round-robin fashion to balance the load among the worker nodes.

12 Claims, 7 Drawing Sheets

METHOD AND PROGRAM FOR PROCESSING A VOLUME OF DATA ON A PARALLEL COMPUTER SYSTEM

BACKGROUND OF THE INVENTION

The present invention is related to processing a volume of data on a parallel computer system, and is more particularly related to processing seismic data by performing three-dimensional dip move out analysis using a parallel computer.

Seismic data is used by geophysicists to map what's beneath the earth's surface. Typically, acoustic receivers are spaced on the surface of the earth from source points of manmade acoustic energy. The sound waves from the source points travel along raypaths from the source points into the earth, and are reflected from subsurface formations to the receivers. The location of the subsurface features are determined by the characteristics, such as time elapsed, of the energy reflected from the formations. The recordings of a single receiver from a single source point is referred to as a trace. Many individual seismic traces make up a seismic survey or seismic dataset. As described, a seismic trace is a set of values or samples which represent the recording of manmade sound waves reflecting from beneath the ground to a specific location on the earth's surface. Seismic data processing is the application of geophysical principles and techniques which enhance the image content of seismic data. The Kirchhoff Three Dimensional Dip Move Out (3D DMO) is a popular technique used to enhance the image content of recorded seismic data where dipping reflectors are present. As sound waves travel from source points to receiver locations, dipping reflectors may cause energy to shift in time and or move laterally from actual image locations. The 3D DMO operator extracts energy from recorded seismic traces and redistributes this energy to those output locations which lie along the raypath between source and receiver points.

Output locations for 3D DMO are defined by a uniform grid of seismic traces, which correspond to coordinates on the earth's surface. These grid locations or bins are defined according to spacing parameters $\Delta x$ and $\Delta y$. Each input trace will impact, on the average, 30 to 50 bins or output traces within the 3D data space. Kirchhoff 3D DMO applies partial sums across bins and along the raypath of seismic energy from source to receiver locations. Each sample or recorded value within an input trace will require 400 to 700 floating point operations to compute partial sums. This represents 12 to 15 floating point operations for each partial sum.

U.S. Pat. No. 5,198,979 issued Mar. 30, 1993 to Moorhead et al. for SEISMIC MIGRATION OF MULTIPROCESSOR COMPUTER discloses a method for Kirchhoff-migrating seismic data using a parallel computer. The disclosed method is to build up one or more migrated output traces in each processor (node) of a multiprocessor machine designated as a "migration" processor, as input traces are passed from migration node to migration node along a nearest-neighbor chain. When an output trace is completed, it is sent by a migration node to storage via an appropriate I/O processor and the migration mode building a new output trace.

What is DMO?, S. M. Deregowski, First Break, Vol. 4, No. 7, July 1986, Pgs. 7–24, discloses a DMO operator and application in removing reflector point dispersal by getting the lateral shift as a function of time dip correct.

The paper A DATA-PARALLEL ALGORITHM FOR KIRCHHOFF 3-D DMO by B. Biondi and W. Moorhead, discloses a data-parallel algorithm for efficiently applying Kirchhoff 3_D DMO to seismic data on a massively parallel computer. The disclosed algorithm is capable of handling arbitrarily irregular surveys; it can thus be employed in production processing. The high speed that the proposed algorithm achieves on massively parallel computers makes possible a considerable shortening in the turnaround time for processing 3-D surveys, and, possible, routine application of more sophisticated 3-D DMO processes.

SUMMARY OF THE INVENTION

The content of the present invention provide methods to perform Kirchhoff 3D DMO and other seismic processing operations using parallel computers. The methods of this invention preferably exploit distributed memory machines, however the invention is applicable to shared memory and other parallel architectures. The present invention can also improve performance of non-seismic applications which require access to large amounts of data during parallel execution.

The methods provided in the present invention improves the parallel efficiency and scalability of the Kirchhoff 3D DMO method on parallel computers. The Kirchhoff 3D DMO method processes input traces and extracts the contribution each sample makes to output traces and sum those quantities into the appropriate locations within a 3D output space. Likewise, other seismic processes where the Kirchhoff technique is used or where input samples make unique contributions to the output, can also employ methods of the invention.

In a preferred method of the present invention, seismic traces are read from disk or tape and are passed to processing nodes which perform the 3D DMO process. Each processing node will receive all or part of each input trace depending on the coding style and implementation of Kirchhoff 3D DMO. Once a trace or portion thereof is received on a processing node, those calculations pertaining to the Kirchhoff 3D DMO operations are performed. Processing nodes will perform a unique subset of 3D DMO calculations and summations depending upon which portion of the 3D output is to be stored in local memory.

A preferred method of the present invention requires that the 3D output data volume is time sliced and distributed to the processing nodes. This distribution of slices is done in a way which evenly divides the output distributed to the processing nodes. This distribution of slices is done in a way which evenly divides the output volume among processors and averages the original locations of slices via a round-robin technique. Each processing node is required to have V/M bytes of available memory where V is the size in bytes of the output volume, and M is the number of processing nodes. Once all input traces have been through the 3D DMO process, output traces are constructed by retrieving samples from time slices on the processing nodes. As complete output traces are formed, they are written to disk or tape.

It is an object of the present invention to provide a method for processing seismic data by a multiprocessor parallel computer system by dividing the seismic data into horizontal time slices, and assigning the time slices to worker nodes to be processed in parallel.

It is a further object of the present invention to provide load balancing of a multiprocessor parallel computer system processing seismic data.

It is a further object of the present invention to provide for performing Kirchhoff 3D DMO processing of seismic data by a multiprocessor parallel computer system.

The foregoing and other objects, features and advantages of the invention will be apparent from the following more particular description of the preferred embodiment of the invention as illustrated in the drawings.

DESCRIPTION OF THE PREFERRED EMBODIMENT

Figures 1, 2:
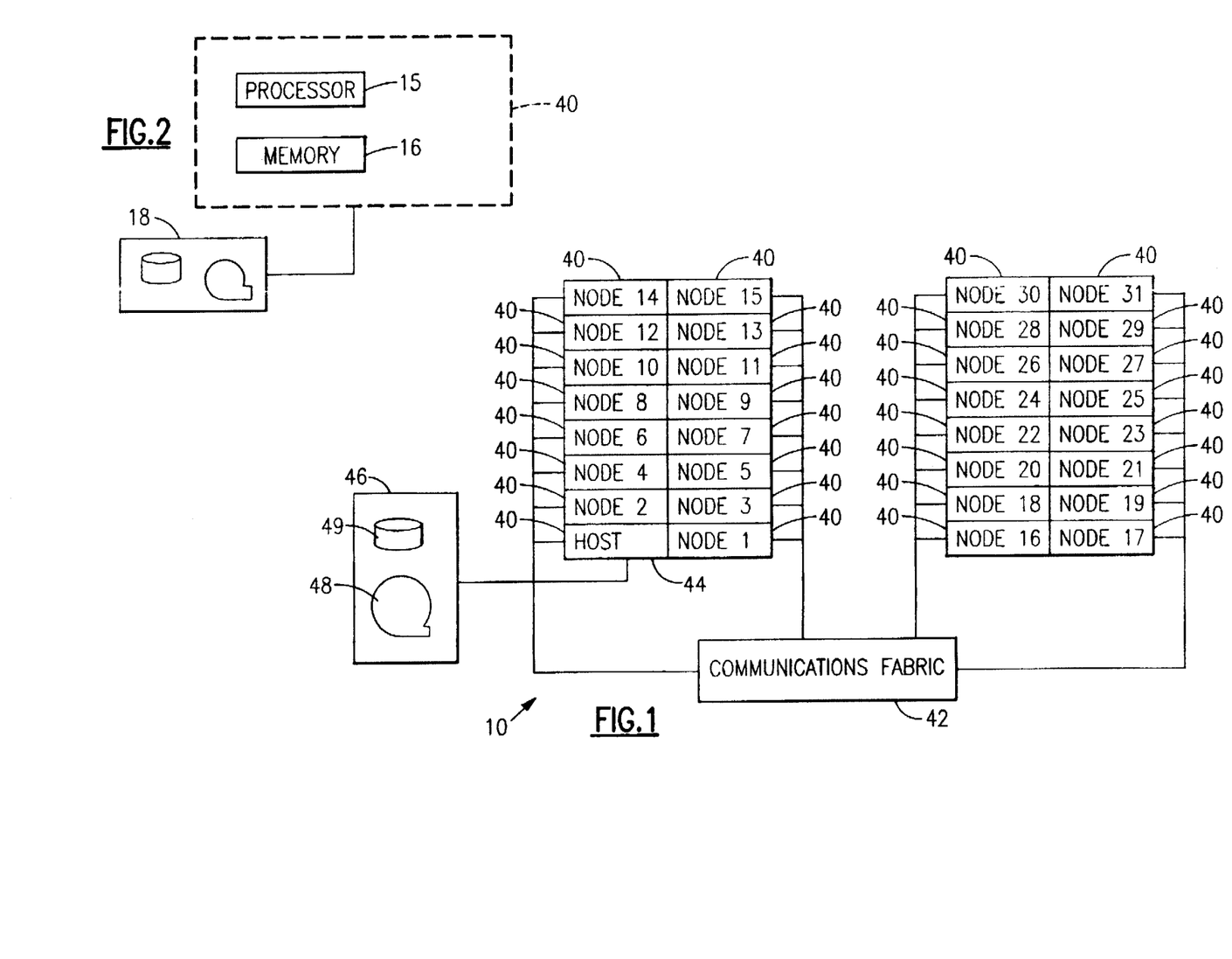
FIG. 1 is a diagram of a distributed memory multiprocessor parallel computer system having a host node and a plurality of worker nodes for performing the Kirchhoff 3D DMO method of the present invention.
FIG. 2 is a diagram of one of the worker nodes of the system of FIG. 1.

FIG. 1 is a diagram of a multiprocessor parallel computer system usable with the present invention having a plurality of nodes 40, and a communications fabric 42 to which each node 40 is connected. The communications fabric 42 may be a local area network (LAN) or a switch over which messages having commands and data may be sent from one node 40 to another node 40. The nodes 40 include at least one host node 44, and a plurality M of worker nodes. In the illustrated embodiment of FIG. 1, the total number of nodes is 32 and the number M of worker nodes is 31, with the worker nodes numbered from Node 1 to Node 31. There is one host node 44. An external memory 46 is connected to the host node 44. The host node 44 handles input/output (I/O) of data, and distributes data between the memory 10 and the worker nodes 40. The external memory 46 have may include one or more tape drives 48, and one or more direct access storage devices (DASD) such as disk drives 49. As shown in FIG. 2, each of the nodes 40 is a full computer having a processor 15, a local, real memory 16, and a connected external memory 18 which is the same as previously described memory 46. It will be understood that any of the nodes 40 may be designated as either a worker node or the host node 44. One such system is the RISC System/6000 Scalable POWERparallel Systems parallel computer available from International Business Machines Corp. of Armonk, N.Y. In a preferred embodiment, the seismic data is stored in the memory 46 by the host node 44, divided to produce horizontal time slices of the output by the host node 44, as will be discussed, and assigned to the worker nodes 40 for processing.

Figure 3:
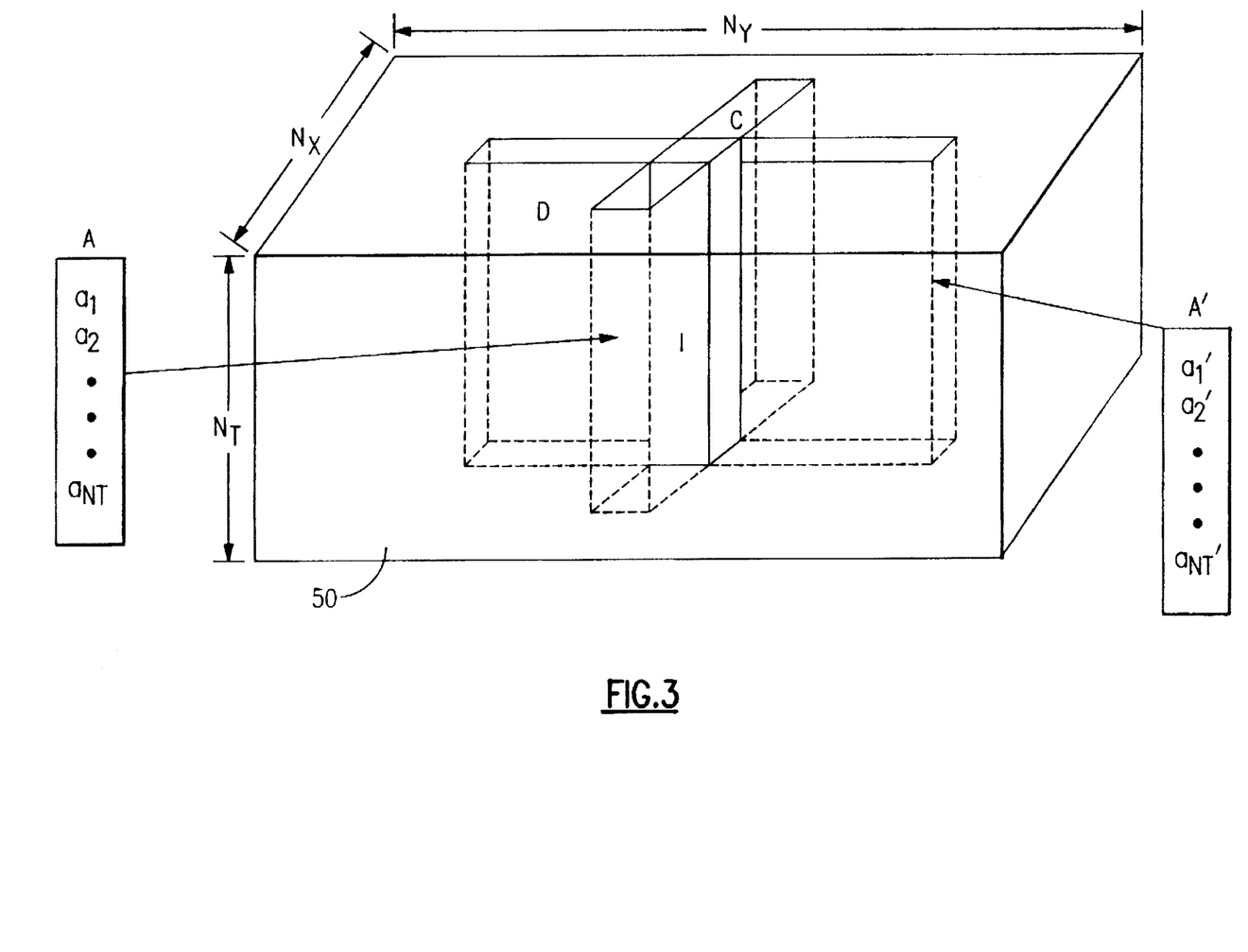
FIG. 3 a simplified diagram representing the output three dimensional (3D) data volume of the present invention.

FIG. 3 is a simplified diagram representing the output 3D data volume 50 having three dimensions, that is, $N_X \times N_Y$ output traces, each having $N_T$ entries. Thus, $N_X$ is the number of traces or memory elements in the X direction, and $N_Y$ is the number of traces or memory elements in the Y direction. The output volume 50 is divided in the T direction into $N_T$ time slices. If $N_X$ and $N_Y$ are equal to 512, and $N_T$ is equal to 1500, the total storage V needed to store the entire data output volume 50 is approximately 1.6 GigaBytes (GB) in size for 4 byte values, or 3.2 GB for 8 byte values. Since shot and receiver locations rarely fall directly along the lines of the previously described grid, output trace locations represent non-adjacent memory addresses when output data is stored in real memory 16, and non-consecutive records when stored on the disk 49. One dimensional input arrays A and A' represent input data from seismic traces. Area C is the section of the 3D data volume or traces of the output data volume 50 which are impacted when the Kirchhoff 3D DMO operator is applied to the input trace A. Similarly, area D is the section of the 3D volume or traces of the output data volume 50 which are impacted when the Kirchhoff 3D DMO operator is applied to input trace A'. The region I is the intersection between areas C and D. As is known, if the two areas C and D are processed independently, updates to values or samples within the intersection area I requires serial execution to insure correct results. As will be explained, since the output volume 50 is divided into horizontal time slices, and each time slice is processed by a single processor 16 of a single node 40, one processor does not have to wait for the results of another processor to complete all calculations for a time slice.

Figure 4:
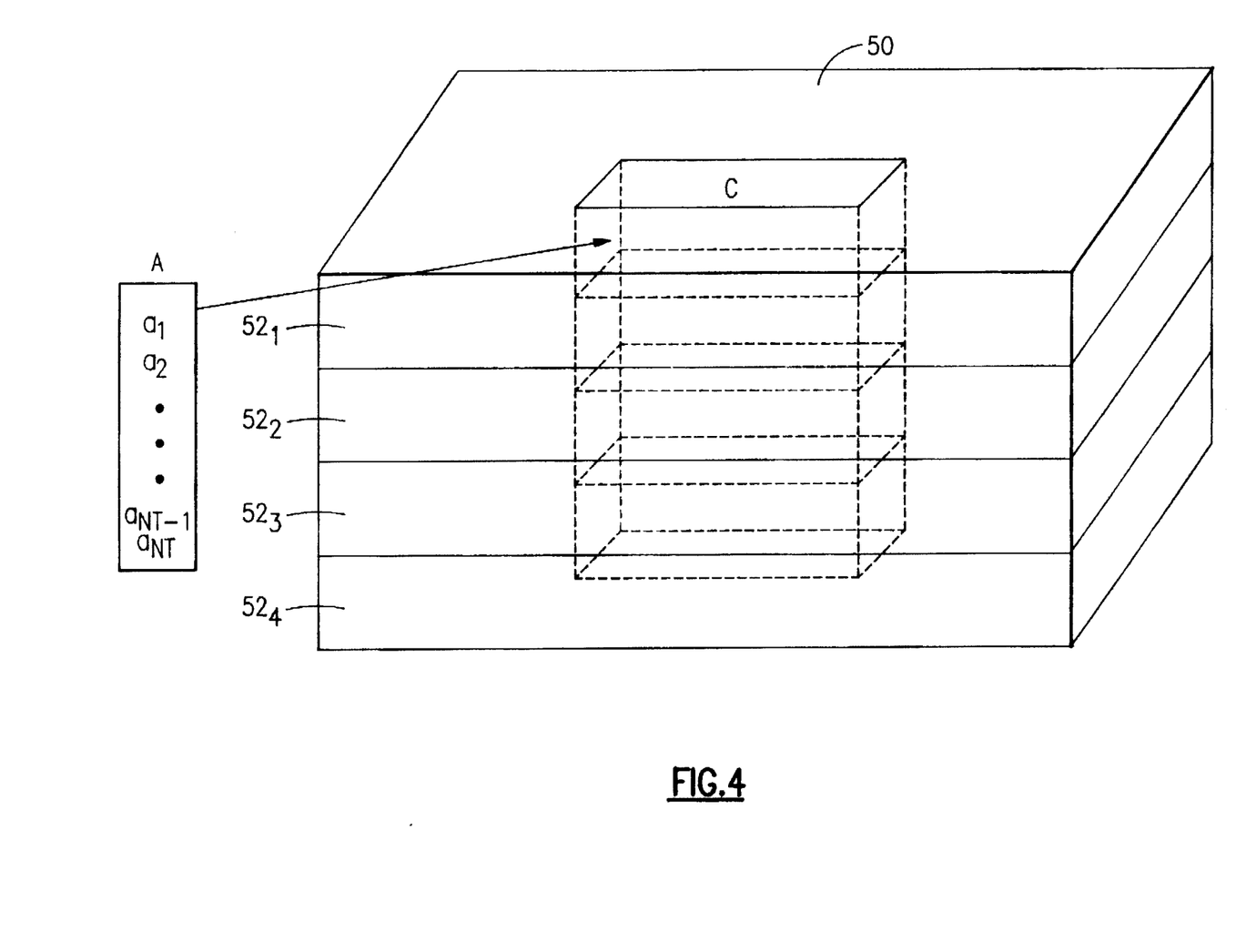
FIG. 4 is a diagram showing the output volume divided horizontally into multiple slabs.

FIG. 4 is a diagram showing the output volume 50 divided horizontally into, for example, four equal slabs $52_1$ through $52_4$ which would be used with a four processor configuration of the parallel processor system 10 of FIG. 1. In that case, each processor 40 would apply the 3D DMO operator to that part of the A input array to give that part of the output area C in its particular slab 52. In this way, the workload among the processors 40 would be more balanced in that each processor 40 would be doing processing to arrive at an equal slab 52 of the area C of the output volume 50.

Figure 5:
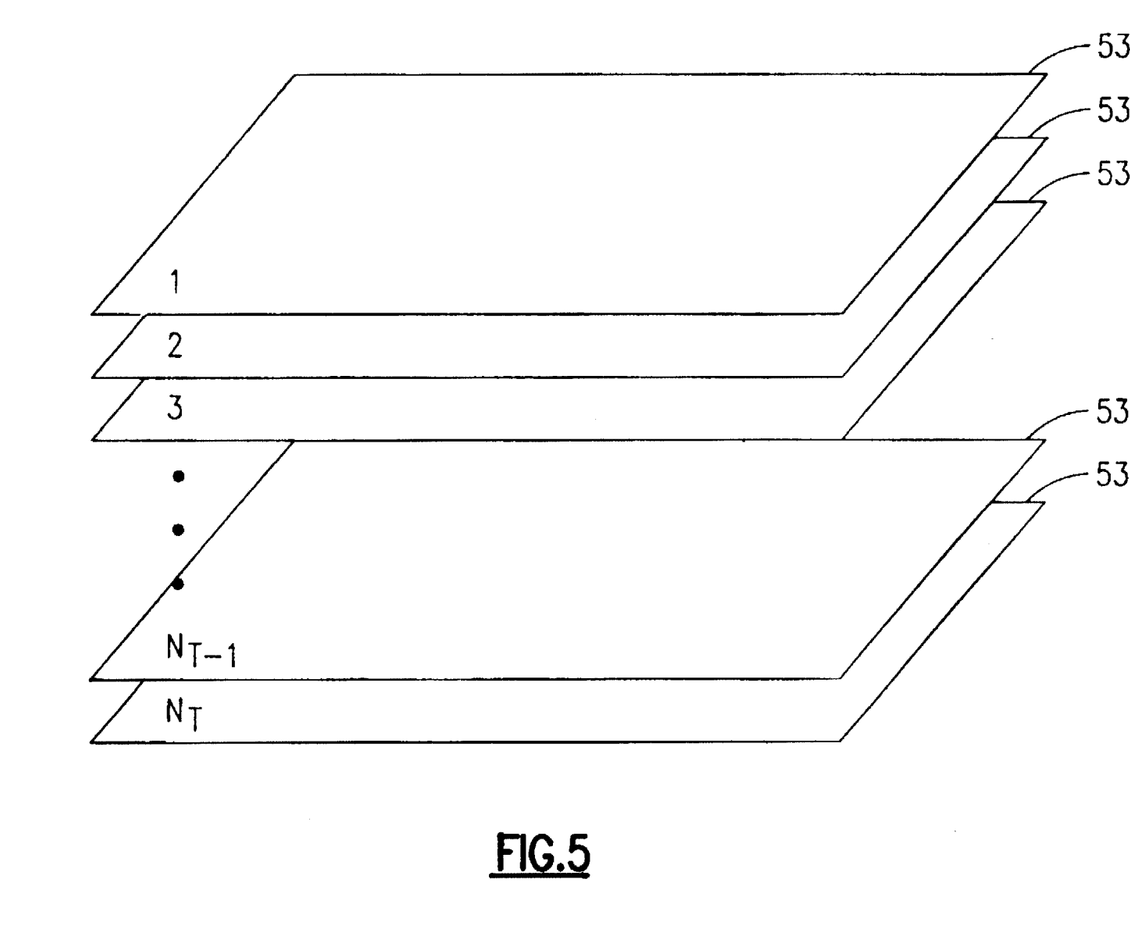
FIG. 5 is a diagrammatic representation of one embodiment of the invention wherein the outpost volume is divided into multiple time slices.

FIG. 5 is a diagrammatic representation of one embodiment of the invention wherein the output volume 50 is divided into $N_T$ time slices 53, where $N_T$ is equal to the total number of increments in the time direction T of the output volume 50 and is equal to or less than M, the number of worker nodes in the parallel system 10 of FIG. 1. Thus, each time slice 53 will be processed by a separate node 40 of the parallel system 10. The amount of memory needed to store the time slice 53 if $N_X$ and $N_Y$ are equal to 512 is approximately 1 MegaByte (MB) for 4 byte values, or approximately 2 MB for 8 byte values.

Figure 6:
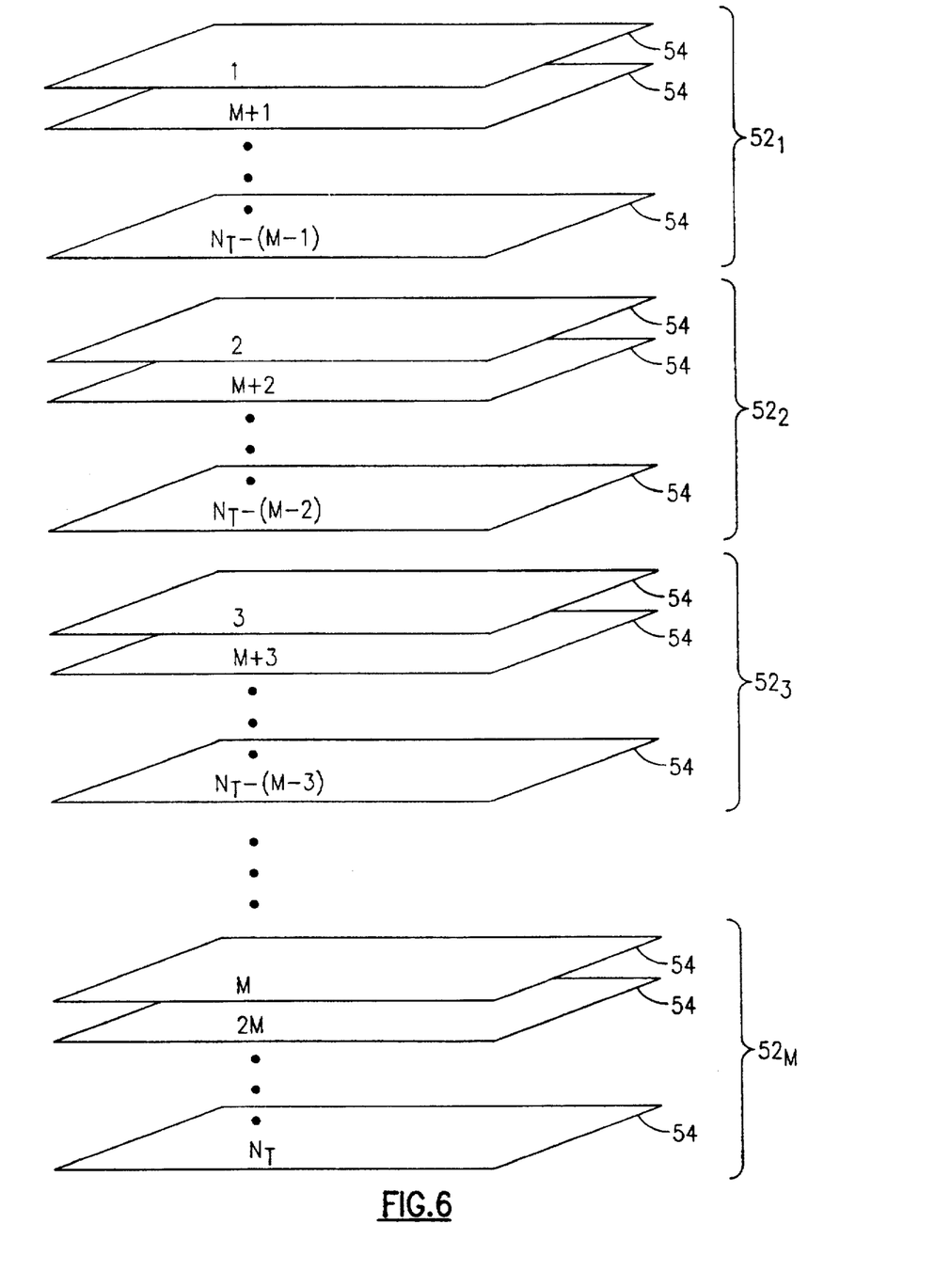
FIG. 6. is a diagrammatic representation of another embodiment of the invention wherein the output volume is divided into multiple time slices grouped into a number of slabs equal to the number of marker nodes of the system of FIG. 1.

FIG. 6 is a diagrammatic representation of another embodiment of the invention wherein the output volume 50 is divided into $N_T$ time slices 54 where $N_T$ is the total number of increments in the time direction T. The time slices are grouped into M slabs 52 where M is the number of worker nodes 40. Each slab 52 will contain $N_T/M$ time slices and is stored in V/M storage locations for the output volume 50 in real memory 16 or external memory 18 for each worker node. It will be noted that the time slices 54 grouped into the slabs 52 of FIG. 6 are different from those of FIG. 4 in that the slabs 52 of FIG. 6 are not contiguous. Thus, slab $52_1$ includes time slices 1, M+1, 2M+1 ... $N_T$−(M−1); slab $52_2$ includes time slices 2, M+2, 2M+2, ... $N_T$−(M−2); ... ; slab $52_N$ includes time slices M, 2M, 3M, ... $N_T$. In the embodiment of FIG. 6, the processor of node 1 through the processor of node M processes slabs $52_1$ through slab $52_M$, respectively. When the first processor, processor 15 of Node 1, completes applying the 3D DMO operator against that portion of the input arrays for time slice 1, it starts on time slice M+1. Likewise, when the second processor, processor 15 of Node 2, completes time slice 2, it starts on time slice M+2. And so on in the described round-robin fashion for all M processors until all $N_T$ time slices have been processed. In the embodiment of FIG. 6, the work load of each processor 15 is more evenly distributed among all of the nodes 40 of the parallel system 10. If the parallel system has 4 nodes and there are a total of 1500 time slices, node 1 processes time slices 1, 5, 9, . . . 1497; node 2 processes time slices 2, 6, 10, . . . 1498; node 3 processes time slices 3, 7, 11, . . . 1499; and node 4 processes time slices 4, 8, 12, . . . 1500. Thus, in the embodiment of FIG. 6, each processor 15 of each worker node 40 processes $N_T/M$ time slices and has sufficient memory to store V/M output values. If the parallel system 10 had 4 worker nodes, and there were 1500 time slices that are 512×512, it would take approximately 393.3 MB for 4 byte values add approximately 786.5 MB for 8 byte values to store the local output values.

Figure 7:
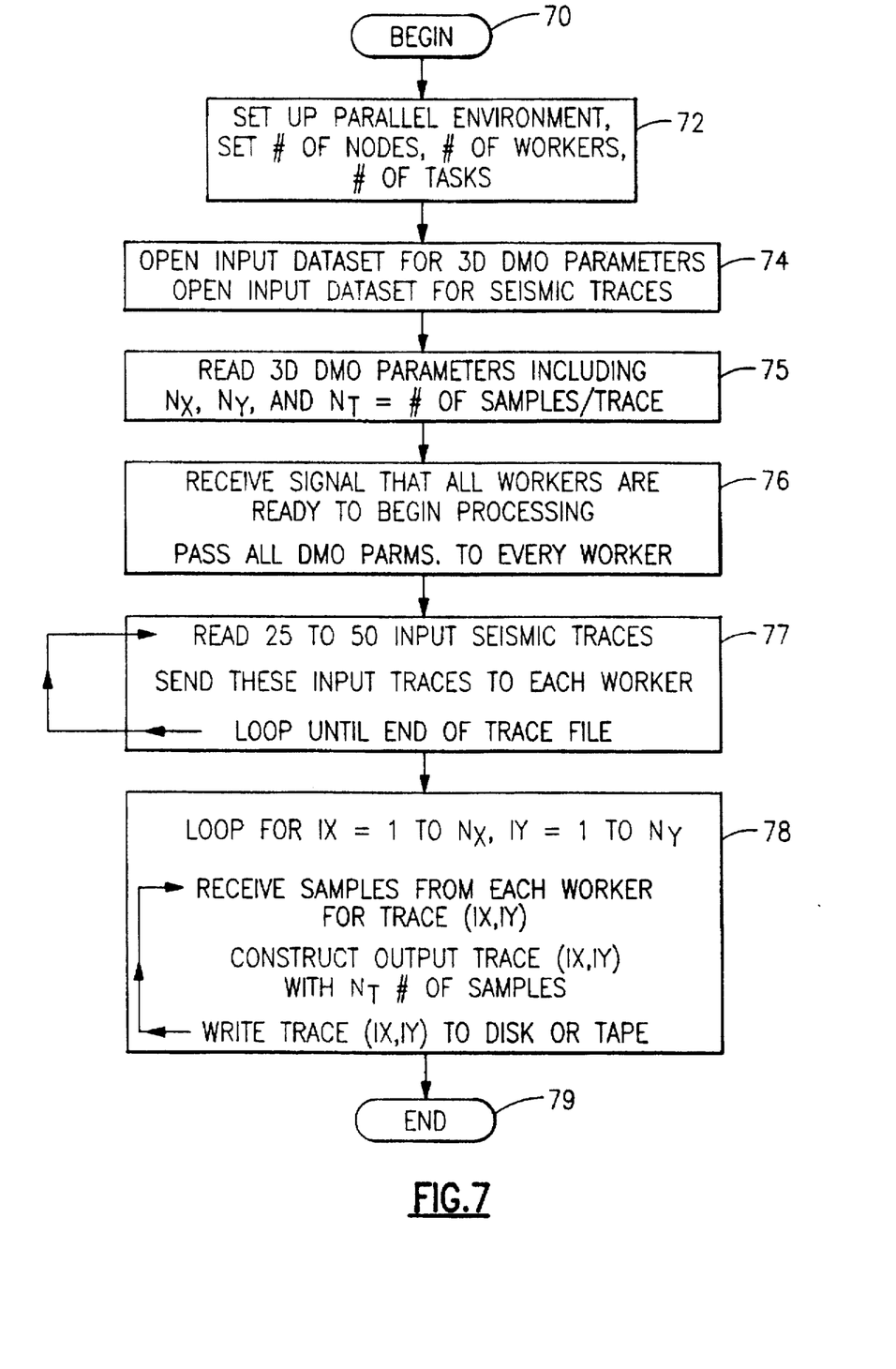
FIG. 7 is a logic flow diagram of the logic routine of the host node of the system of FIG. 1.

FIG. 7 is a flowchart of the logic of the host node 44 to perform Kirchhoff 3D DMO of the present invention. The procedure begins at 70 and goes to 72 where the parallel environment of the system 10 is set up. At 72, the number of nodes 40 and the number M of the worker nodes in the system 10, and the number of tasks to be performed by the system are established. At 74, the input datasets for the 3D DMO parameters are opened, and the input datasets for the seismic traces, such as the input arrays A and A' of FIG. 3, are opened. These datasets are stored in the external memory 46 of the host node 44. At 75, the 3D DMO. parameters are read from the memory 46. These parameters include $N_X$, $N_Y$, $N_T$ which is used to determine the number of samples per trace. At 76, the host node 44 receives messages, such as a receive signals from the worker nodes 40, that all worker nodes 40 are ready to begin processing. The host node 44 then sends all of the 3D DMO parameters read at 75 to all of the workers 40 which are to take part in the solution. This may be all of the worker nodes 40, or may be a subset of workers nodes 40, as desired. At 77, the host performs a loop wherein 25 to 50 input seismic traces are read and then sent to each worker node 40. The loop 77 continues until all of the trace files have been read by the host node 44 and distributed to the worker nodes 40. It will be understood that all of the data points for each trace may be sent to each of the worker nodes 40, or only those data points needed for a particular worker node 40 may be sent by the host node 44, as desired.

At 78, a loop is performed by the host node 44 after the 3D DMO calculations have been performed by each of the worker nodes 40. IX and IY are indexes for the loop 78, wherein IX is incremented from 1 to $N_X$ and IY is incremented from 1 to $N_Y$. In the loop 78, the host node 46 receives the processed samples from each worker node 40 for the trace (IX,IY) as processed by that worker node 40. The host then constructs the complete output trace (IX,IY) by assembling all of the horizontal increments $N_T$ processed by all of the worker nodes 40. The output traces (IX,IY) is then written to a tape file 48 or disk file 49 of the host memory 46 for permanent storage. The routine of the host node 44 stops at 79 when the complete output trace volume 50 (see FIGS. 3 and 4) is stored.

Figure 8:
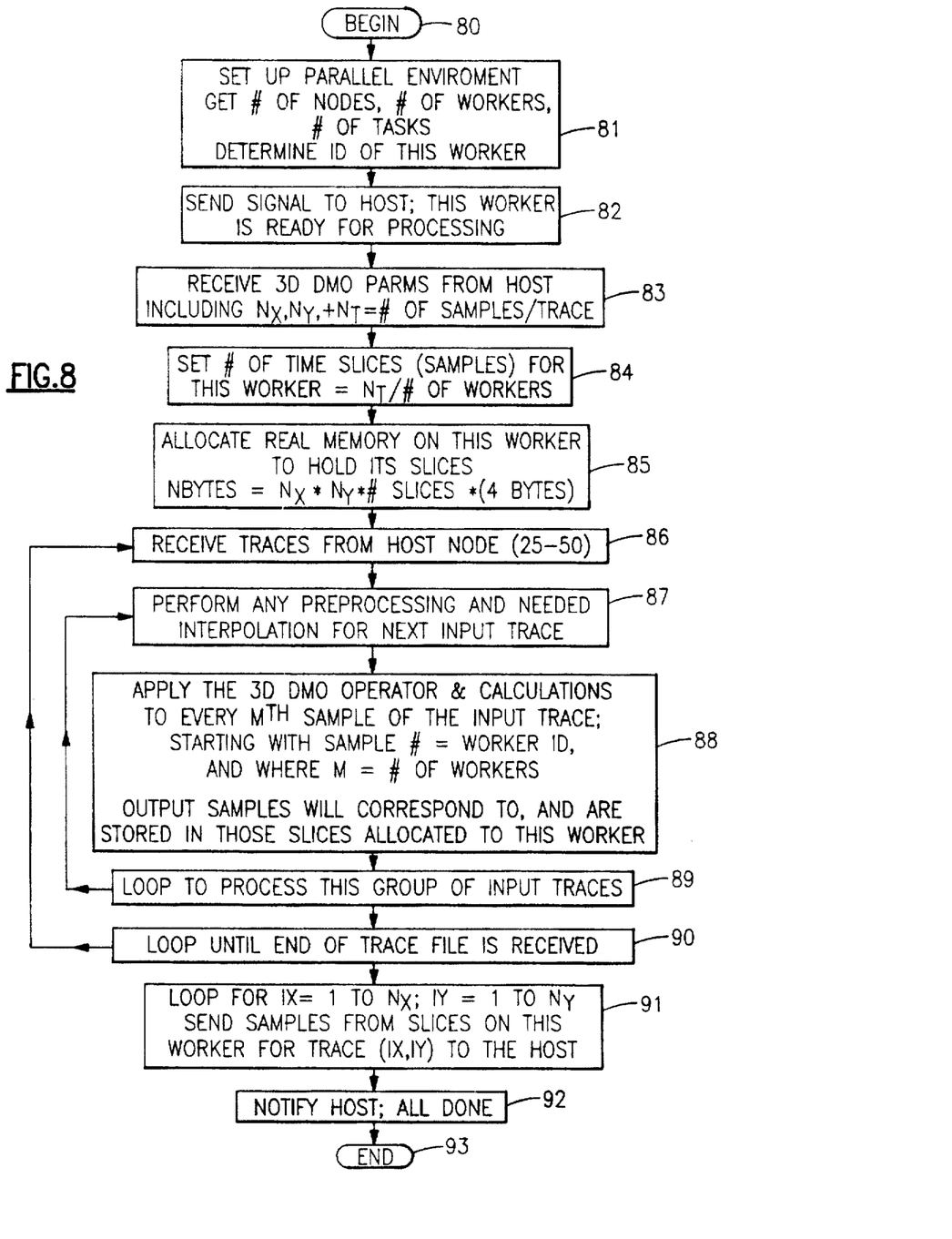
FIG. 8 is a logic flow diagram of the logic routine of a worker node of the system of FIG. 1.

FIG. 8 is a flowchart of the logic of each of the worker nodes 40. The logic starts at 80. The routine initiates at 81 wherein the parallel environment of the worker node 40 is initialized including determining the number of nodes, number of workers, and number of tasks to be performed. The worker node 40 also determines its identification (ID) which, among other functions, determines the horizontal slice or slices this worker node 40 will process. At 82, this worker node 40 sends a message or signal to the host 44 that this worker node 40 is ready for processing. It will be understood that the message sent at 82 is received by the host node 44 at 76 of FIG. 7. As previously mentioned, when the worker nodes 40 are ready to start processing, the 3D DMO parameters are sent by the host node 44, also at 76 of FIG. 7. Returning to FIG. 8, the 3D DMO parameters are received at 83 by this worker node 40. These parameters include $N_X$, $N_Y$ and $N_T$ which are used to determine the number of samples per trace to be handled by this worker node 40. At 84, the worker node 40 determines the number of time slices or samples the this worker is to process. The number of time slices, as discussed in connection with FIG. 6, is equal to $N_T/M$ or the number of time slices divided by the number of worker nodes 40. At 85, the worker node 40 allocates the amount of its real memory to hold the number of slices to be processed. The number of bytes (NBYTES) for a 4 byte embodiment is calculated as follows:

NBYTES=$N_X$*$N_Y$*($N_T$/M)*(4BYTES)

At 86–90, a loop is performed to process the traces by this worker node 40. At 86, the worker node 40 receives the traces from the host node 44. It will be understood that the traces received at 86 are those traces that were sent by the host node 44 at 77 of FIG. 7. At 87, the worker node 40 performs any preprocessing and needed interpolation for the next input trace. At 88, a 3D DMO operator is applied and calculations are made in accordance with the 3D DMO method. In the preferred method discussed in connection with FIG. 6, this is done to every $M^{th}$ sample of the input trace, starting with the sample which is equal to the worker ID, and where M is the number of worker nodes 40. If all of the input traces are sent to the worker nodes at 76, the worker node, using its ID, only uses that portion of the input traces needed to do its calculations to process its respective time slice or slices. If only the input traces needed by this worker node is sent at 77, this worker node processes all input traces data it receives to process its respective time slice or slices. It will be understood that the output samples will correspond to, and are stored in those slices allocated to this worker node in the memory of this worker node 40. At 89, the logic routine of the worker node 40 loops back to 87 until the current group of input traces is processed. At 90, the logic routine of the worker node 40 loops back to 86 until all of the traces in the trace file have been received and processed.

At 91, a loop is performed wherein IX is an index from 1 to $N_X$ and IY is an index from 1 to $N_Y$. The loop at 91 is completed to send samples from the slices processed by this worker node 40 for the traces (IX,IY) to the host node 44. It will be understood that the loop at 91 is repeated for each time slice until all slices processed by this worker node are sent to the host node. At 92, this worker node 40 notifies the host 44 that this worker node 40 is complete. At 93, the routine ends. It will be understood that when all worker nodes 40 notify the host node 44 that they are complete, loop 78 of FIG. 7 is completed by the host node 44 to store each individual time slice processed by the worker nodes 40 into a complete output trace for output volume 50 as discussed in connection with FIGS. 3 and 4.

It will be understood that the present invention may be used to process any data volume having at least three dimensions, by slicing the data volume into slices along one dimension, and having a separate worker node process each slice in parallel with other worker nodes processing other slices. The slices may be divided among the worker nodes in such a way as to balance the load among the worker nodes, as described.

While I have illustrated and described the preferred embodiment of my invention, it is to be understood that I do not limit myself to the precise construction herein disclosed, and the right is reserved to all changes and modifications coming within the scope of the invention as defined in the appended claims.

Having thus described my invention, what I claim as new, and desire to secure by Letters Patent is:

1. In a multiprocessor parallel computer system having distributed memory, a method for processing data having at least three dimensions, the method comprising:

allocating one of said processors of said parallel computer system as a host node for distributing said data;

allocating of multiple processors as worker nodes for processing the data in parallel;

dividing said data into slices along one of the dimensions of the data representing depth;

distributing each slice to memory segments of said distributed memory; and assigning each worker node to memory segments of said distributed memory to which a slice has been assigned such that contiguous slices are assigned to different worker nodes, each worker node processing a slice in parallel with and independent from the slices being processed by other worker nodes.

2. The method according to claim 1 further comprising assigning said worker nodes so as to balance the load of processing said data among said worker nodes.

3. In a multiprocessor parallel computer system having distributed memory, a method for processing data having at least three dimensions, the method comprising:

allocating one of said processors of said parallel computer system as a host node for distributing said data;

allocating multiple processors into M worker nodes for processing data in parallel;

storing said data in said distributed memory of said parallel computer system;

dividing said data into M slabs along one dimension of the data representing depth;

subdividing each slab of data into M slices along said one dimension;

assigning a respective slice of each slab to the worker nodes, respectively, for processing the data in parallel; and as the processing of data in each slice is completed by a worker node, assigning the respective slice of the next slab, in turn, to the worker node that has thus completed.

4. In a multiprocessor parallel computer system having distributed memory, a method for processing seismic data comprising:

allocating one of said processors of said parallel computer system as a host node for distributing said seismic data;

allocating of multiple processors as worker nodes for processing seismic data in parallel;

dividing said seismic data into time slices, each time slice representing a horizontal slice of the volume represented by the seismic data;

distributing each time slice to memory segments of said distributed memory; and assigning each worker node to memory segments of said distributed memory to which a time slice has been assigned such that contiguous slices are assigned to different worker nodes, each worker node processing a time slice in parallel with and independent from the time slices being processed by other worker nodes.

5. The method according to claim 4 further comprising assigning said worker nodes so as to balance the load of processing said seismic data among said worker nodes.

6. The method according to claim 5 wherein said data processing of seismic data comprises Kirchhoff 3D DMO calculations.

7. In a multiprocessor parallel computer system having distributed memory, a method for processing seismic data comprising:

allocating one of said processors of said parallel computer system as a host node for distributing said seismic data;

allocating multiple processors into M worker nodes for processing seismic data in parallel;

storing said seismic data in said distributed memory of said parallel computer system;

dividing said seismic data into M horizontal slabs of data from the volume represented by the seismic data;

subdividing each slab of data into M time slices;

assigning a respective time slice of each slab to the worker nodes, respectively, for processing seismic data in parallel; and as the processing of seismic data in each time slice is completed by a worker node, assigning the respective time slice of the next slab, in turn, to the worker node that has thus completed.

8. The method according to claim 7 wherein said data processing of seismic data comprises Kirchhoff 3D DMO calculations.

9. A program recorded on a computer readable medium for use in a multiprocessor parallel computer system having distributed memory, a host node and a plurality of worker nodes, the program performing a method of processing data having at least three dimensions comprising:

dividing said data into slices along one of the dimensions of the data representing depth;

distributing by said host node, each slice to memory segments of said distributed memory; and assigning by said host node, each worker node to memory segments of said distributed memory to which a slice has been assigned such that contiguous slices are assigned to different worker nodes, each worker node processing a slice in parallel with and independent from the slices being processed by other worker nodes.

10. A program recorded on a computer readable medium for use in a multiprocessor parallel computer system having distributed memory, a host node and a plurality of worker nodes, the program performing a method of processing data having at least three dimensions comprising:

storing said data in said distributed memory of said parallel computer system;

dividing by said host node, said data into M slabs along one dimension of the data, where M is equal to the number of worker nodes;

subdividing by said host node, each slab of data into M slices along said one dimension;

assigning by said host node, a respective slice of each slab to the worker nodes, respectively, for processing the data in parallel; and as the processing of data in each slice is completed by a worker node, assigning the respective slice of the next slab, in turn, to the worker node that has thus completed.

11. A program recorded on a computer readable medium for use in a multiprocessor parallel computer system having distributed memory, a host node and a plurality of worker nodes, the program performing a method of processing seismic data comprising:

dividing said seismic data into time slices, each time slice representing a horizontal slice of the volume represented by the seismic data;

distributing each time slice to memory segments of said distributed memory; and assigning each worker node to memory segments of said distributed memory to which a time slice has been assigned such that contiguous slices are assigned to different worker nodes, each worker node processing a time slice in parallel with and independent from the time slices being processed by other worker nodes.

12. A program recorded on a computer readable medium for use in a multiprocessor parallel computer system having distributed memory, a host node and a plurality of worker nodes, the program performing a method of processing seismic data comprising:

storing said seismic data in said distributed memory of said parallel computer system;

dividing said seismic data into M horizontal slabs of data from the volume represented by the seismic data;

subdividing each slab of data into M time slices;

assigning a respective time slice of each slab to the worker nodes, respectively, for processing seismic data in parallel; and as the processing of seismic data in each time slice is completed by a worker node, assigning the respective time slice of the next slab, in turn, to the worker node that has thus completed.

* * * * *